United States Patent
Mogi et al.

(10) Patent No.: US 7,691,517 B2
(45) Date of Patent: Apr. 6, 2010

(54) FUEL CELL SYSTEM WITH A WATER HOLDING MEMBER

(75) Inventors: Satoshi Mogi, Yamato (JP); Kazuyuki Ueda, Tokyo (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 11/515,844

(22) Filed: Sep. 6, 2006

(65) Prior Publication Data
US 2007/0059579 A1  Mar. 15, 2007

(30) Foreign Application Priority Data
Sep. 13, 2005  (JP) .............. 2005-265790

(51) Int. Cl.
H01M 2/00 (2006.01)
H01M 2/14 (2006.01)
(52) U.S. Cl. .............................. 429/34; 429/38; 429/39
(58) Field of Classification Search .............. None
See application file for complete search history.

(56) References Cited

U.S. PATENT DOCUMENTS 6,057,051 A * 5/2000 Uchida et al. ................. 429/19
2005/0106441 A1 5/2005 Yamamoto et al. ............. 429/34
2005/0221147 A1 10/2005 Shioya et al. .................. 429/34
2006/0019145 A1 1/2006 Mogi et al. .................... 429/39
2006/0141303 A1 6/2006 Mogi et al. .................... 429/22
2007/0077477 A1 4/2007 Mogi et al. .................... 429/32
2007/0099066 A1 5/2007 Okumura et al. ............... 429/40

FOREIGN PATENT DOCUMENTS

JP  9-213359   8/1997
JP  10-92456   4/1998

* cited by examiner

Primary Examiner—Dah-Wei D Yuan
Assistant Examiner—Kwang Han
(74) Attorney, Agent, or Firm—Fitzpatrick, Cella, Harper & Scinto

(57) ABSTRACT

There is provided a fuel cell system which can prevent the drying of a proton exchange membrane and prevent the generation of liquid droplets at a hydrogen tank surface which blocks the supply of air, at the same time, and which includes a hydrogen tank, a fuel cell stack disposed such that a first air hole thereof faces the hydrogen tank and a second air hole thereof is open to the atmosphere, and a water holding member provided on a surface of the hydrogen tank facing the first air hole of the fuel cell stack, for collecting and holding water generated in the fuel cell stack.

3 Claims, 6 Drawing Sheets

FUEL CELL SYSTEM WITH A WATER HOLDING MEMBER

BACKGROUND OF THE INVENTION

1. Field of the Invention

The present invention relates to a fuel cell system.

2. Description of the Related Art

Japanese Patent Application Laid-Open No. H10-092456 discloses, as a fuel cell system for a small electric equipment, a configuration in which proton exchange membrane fuel cells (or polymer electrolyte fuel cells) are driven with hydrogen supplied from a hydrogen storage alloy and air. The hydrogen releasing process of a hydrogen storage alloy is an endothermic reaction, so that the temperature of the hydrogen storage alloy decreases when supplying the hydrogen fuel. Because the hydrogen releasing ability of the hydrogen storage alloy is lowered with the decrease of the temperature of the alloy, it is necessary to heat the hydrogen storage alloy in order to assure a sufficient flow rate of hydrogen.

On the other hand, because the power generation by means of a fuel cell is accompanied by heat generation, it has been proposed to utilize heat generated by a fuel cell to heat a hydrogen storage alloy. As shown in FIGS. 6 and 7, Japanese Patent Application Laid-Open No. H10-092456 proposes a fuel cell system for a small electric equipment in which a fuel cell stack 1 for generating a power using air and hydrogen, and a hydrogen tank 2 for storing hydrogen to be supplied to the fuel cell stack 1 are connected to each other. The fuel cell system for a small electric equipment has a structure in which the heat generated in the fuel cell stack 1 is guided to the hydrogen tank 2 to heat the hydrogen tank. In the figures, reference numeral 4 denotes an air hole; reference numeral 6 denotes a hydrogen manifold; reference numeral 9 denotes an air blowing means; and the thick solid arrow indicates the movement of air.

However, in the reaction of a fuel cell, hydrogen ions which have passed through a proton exchange membrane (polymer electrolyte membrane) and an oxidizer (oxygen) react with each other in an oxidizer electrode to generate at the oxidizer electrode. Therefore, the exhaust gas of the fuel cell contains water (water vapor). Accordingly, there have been cases where the water-containing gas exhausted from the oxidizer electrode is condensed at the surface of the hydrogen tank to generate water droplets. Especially, in a fuel cell system having a reduced size, the distance between a hydrogen tank and a fuel cell stack is small. Therefore, there has been a problem that when water droplets are generated at the surface of the tank, airflow is blocked thereby making it difficult to supply air necessary for power generation to the fuel cell stack, whereby a stable output cannot be obtained.

The ion conductivity having an influence on the performance of a proton exchange membrane fuel cell greatly depends on the wettability of the proton exchange membrane. That is, drying of the proton exchange membrane leads to remarkable reduction of the conductivity, so that the output is reduced because of the increase of the internal resistance. Accordingly, for power generation using a proton exchange membrane fuel cell, it is necessary that the proton exchange membrane for ionic conduction is suitably wet.

In development of a power supply system using a proton exchange membrane fuel cell, the method of humidifying a proton exchange membrane has been widely considered. For example, Japanese Patent Application Laid-Open No. H09-213359 proposes a fuel cell system composed of a fuel cell stack for generating a power using air and hydrogen, a hydrogen tank for storing hydrogen to be supplied to the fuel cell stack, and a structure for holding water generated in the fuel cell stack and humidifying the hydrogen.

However, as described in Japanese Patent Application Laid-Open No. H09-213359, in the configuration of using the generated water to humidify hydrogen, there has been a problem that a means for introducing the held water into hydrogen gas needs to be separately provided, which increases the size of the fuel cell system.

Further, the configurations of the prior art fuel cell systems have the following problems in attaining a fuel cell system having a more reduced size. That is, when a hydrogen tank is heated using an exhaust gas from an oxidizer electrode of a fuel cell stack, there have been case where the supply of air is blocked by generation of liquid droplets through dewing at the surface of the hydrogen tank. When the flow rate of air is increased in order to prevent the dewing at the surface of the hydrogen tank, there is posed a problem that the proton exchange membrane is dried to reduce the output of the fuel cell. Further, because the power generation makes the temperature of the fuel cell stack higher than the temperature of surroundings, supplying an excessive amount of low-temperature air from ambient air decrease the humidity inside the oxidizer electrode. Therefore, it has been difficult to reduce the size of the fuel cell system while attaining the prevention of dewing at the hydrogen tank and the prevention of drying in the oxidizer electrode at the same time.

Moreover, there has also been a problem that in order to hold the generated water collected at a hydrogen tank or the like and to humidify a supply gas, a separate humidifying mechanism becomes necessary, which makes complicated the configuration/control of the fuel cell system.

SUMMARY OF THE INVENTION

The present invention provides a fuel cell system which comprises a hydrogen tank, a fuel cell stack disposed such that a first air hole thereof faces the hydrogen tank and a second air hole thereof is open to the atmosphere, and a water holding member provided on a surface of the hydrogen tank facing the first air hole of the fuel cell stack, for collecting and holding water generated in the fuel cell stack.

According to the constitution of the present invention, it is possible to prevent the drying of a proton exchange membrane and to prevent the generation of liquid droplets at a hydrogen tank surface which blocks the supply of air, at the same time. Further, the tolerance (or robustness) to water balance (hydrologic balance) increases and complicated control for management of water becomes unnecessary. Accordingly, further reduction in size of a fuel cell system becomes possible and it is possible to provide a small fuel cell system for a small electric equipment.

Further features of the present invention will become apparent from the following description of exemplary embodiments with reference to the attached drawings.

DESCRIPTION OF THE EMBODIMENTS

Embodiments of the present invention will be described with reference to the attached drawings.

Figure 1:
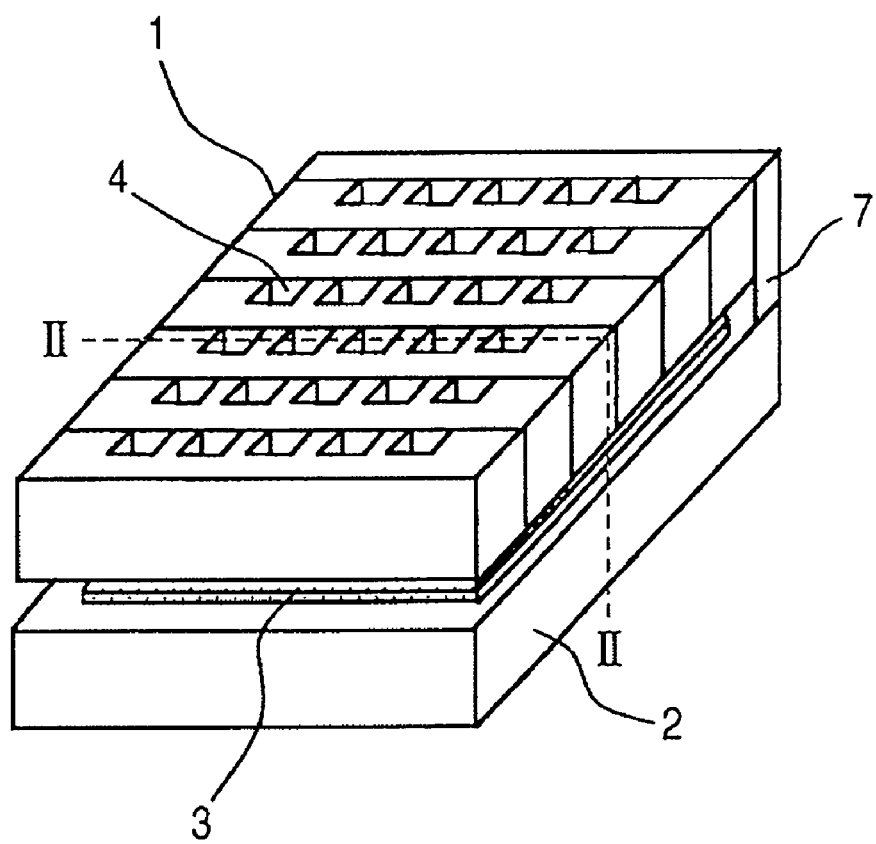
FIG. 1 is a schematic perspective view of a fuel cell system in accordance with the present invention.
Figure 2:
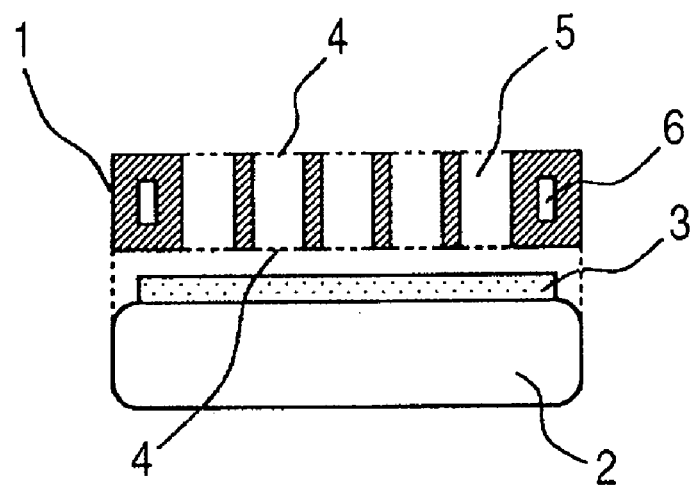
FIG. 2 is a schematic cross-sectional view taken along line II-II in FIG. 1.

FIG. 1 is a schematic perspective view of a fuel cell system in accordance with one embodiment of the present invention, and FIG. 2 is a schematic cross-sectional view taken along line II-II in FIG. 1. As shown in the figures a fuel cell stack 1 and a hydrogen tank 2 are disposed so as to face each other. In the fuel cell stack 1 are provided air holes 4 for supplying air of the atmosphere to an oxidizer electrode. The air holes are provided at the atmosphere side and at the hydrogen tank side. On a fuel cell side surface of the hydrogen tank 2 is provided a water holding (or retaining) member 3.

The fuel cell stack is configured by alternately stacking fuel cells and separators on each other. Each fuel cell has a membrane electrode assembly (MEA) formed by providing, respectively, a fuel electrode catalyst layer and an oxidizer electrode catalyst layer on both surfaces of a proton exchange membrane, porous conductive diffusion layers such as of carbon cloth provided on both surfaces thereof, and a fuel flow path for fuel supply and an oxidizer flow path 5 for oxidizer supply. The fuel flow path is connected to a fuel manifold 6 provided in a separator, while the oxidizer flow path 5 is open to the atmosphere through the air holes 4.

The fuel manifold 6 is connected to the hydrogen tank 2 via a connecting portion 7, and hydrogen released from the hydrogen tank 2 is supplied to the fuel electrode. Because the hydrogen releasing reaction of a hydrogen storage alloy is an endothermic reaction, the temperature of the hydrogen storage alloy decreases accompanying the release of hydrogen. In general, the hydrogen storage alloy has the characteristic that the hydrogen release rate thereof decreases as the temperature thereof decreases. With the configuration of the present embodiment, heat is effectively transferred to the hydrogen tank accompanying the heat generation of the fuel cell stack. Therefore, hydrogen which is necessary for power generation in the fuel cell stack can be supplied from the hydrogen tank.

Through the air holes, oxygen is supplied from the atmosphere, and water generated by the power generation reaction is discharged mainly in the form of water vapor. The water vapor discharged from the air holes 4 facing the hydrogen tank is partly held by the water holding member 3 provided on the surface of the hydrogen tank 2. On the other hand, the water vapor discharged from the air holes 4 on the side of the fuel cell stack 1 opposite to the hydrogen tank 4 is exhausted into the atmosphere. The air supplied to the air holes of the fuel cell stack directly from the atmosphere is at room temperature and is therefore in a relatively dry state. In contrast, the air which has passed along the surface of the hydrogen tank 4 is supplied to the air holes in a relatively humidified state because of the water held by the water holding member and the heat accompanying the heat generation of the fuel cell stack. Therefore, with the configuration of the present embodiment, the proton exchange membrane will not be dried, so that a stable output can be obtained.

Figure 3:
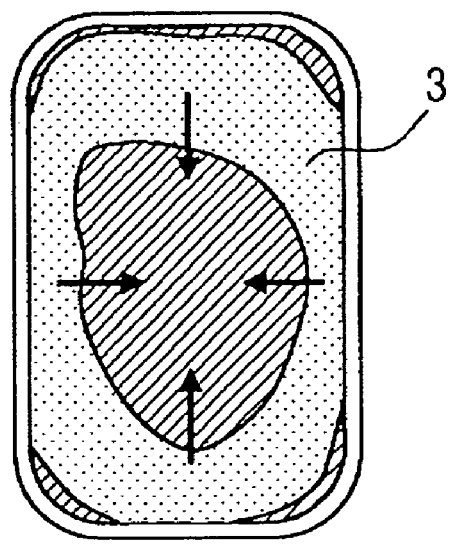
FIG. 3 is a schematic view illustrating the movement of water (indicated by arrows) in a water holding member provided on a surface of a hydrogen tank in accordance with the present invention.

The water holding member according to the present embodiment is provided in a sheet shape on the hydrogen tank surface. As the material of the water holding member, there may be used water-absorbing fibers such as fibrous cellulose, a polymer containing polyacrylic acid salt as a main component, and the like. Water condensed in the vicinity of the water holding member will be absorbed and held by the water holding member and will not form liquid droplets to block air flow. Moreover, as shown in FIG. 3, the water absorbed by the water holding member will extend over the entire surface of the water holding member through capillarity or diffusion. Therefore, in a region of the water holding member which faces the peripheral portion of the fuel cell stack, water is absorbed because the region is at a relatively low temperature, and the absorbed water extends over the entire surface of the water holding member. On the other hand, in a region whose temperature is high, the water in the water holding member is vaporized with the heat generated by the fuel cell stack to effectively humidify air existing in the vicinity of the hydrogen tank surface. Accordingly, even at the central part of the fuel cell stack in which the temperature becomes high, the proton exchange membrane is humidified to improve the output of the fuel cell.

Figure 4A:
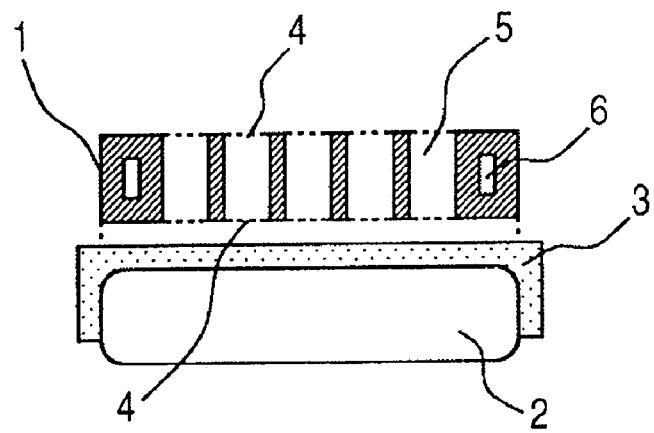
FIGS. 4A, 4B, and 4C are schematic views illustrating examples of a water holding member in accordance with the present invention.
Figure 4B:
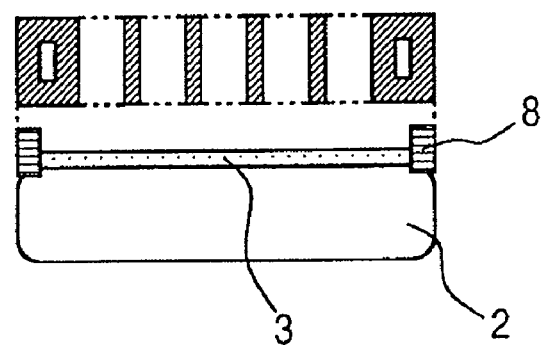
Figure 4C:
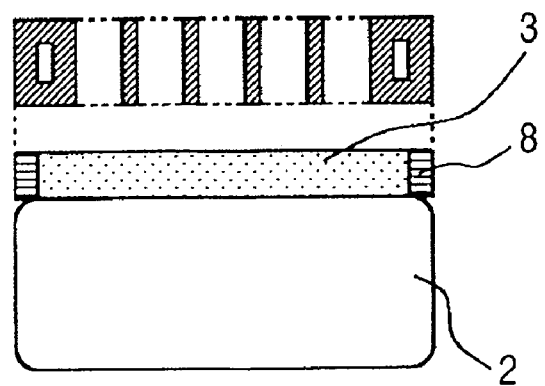

As shown in FIG. 4A, the water holding member 3 may be provided so as to extend over a surface of the hydrogen tank 2 not facing the fuel cell stack 1 to thereby promote the vaporization of water. Further, as shown in FIG. 4B, a frame 8 may be provided at the periphery of the water holding member 3 to thereby suppress the vaporization of water. Such adjustment of the vaporization amount may be made suitably depending on the characteristics of the fuel cell system and the environment/load during use. Moreover, as shown in FIGS. 4B and 4C in comparison, the water holding (or retention) capacity of the water holding member 3 may be adjusted depending on the hydrogen capacity of the hydrogen tank 2. For example, when the hydrogen capacity of the hydrogen tank is large and the necessary amount of water absorption is also large, the water holding capacity may be made large, while, on the contrary, when the hydrogen capacity of the hydrogen tank is small, the water holding capacity may be made small. By adopting such a configuration that the water holding member can be replaced concurrently with the replacement of the hydrogen tank, the generated water can be discharged easily and the fuel cell system can be operated continuously.

By providing the water holding member, it becomes possible to operate the fuel cell stack in an excessively wet environment within a fixed period of time. Further, even when the atmosphere temporarily becomes more dry than usual, the output is maintained owing to the humidification by the water holding member. That is, by providing the water holding member, the tolerance to water balance (hydrologic balance) increases. Thereby, complicated control for management of water becomes unnecessary and further reduction in size of a fuel cell system becomes possible.

Figure 5A:
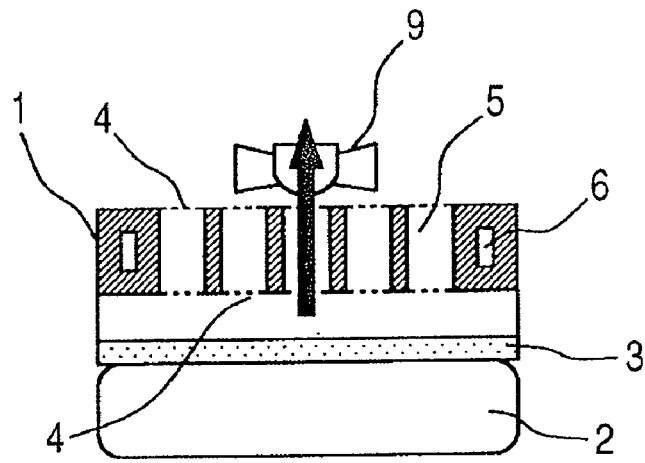
FIGS. 5A, 5B, and 5C are schematic views illustrating examples of an air blower in accordance with the present invention, in which thick solid arrows each indicate the movement of air.
Figure 5B:
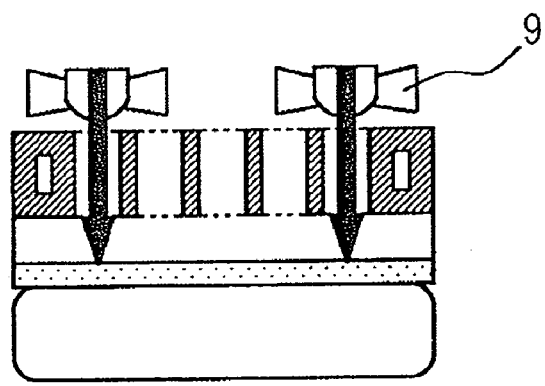
Figure 5C:
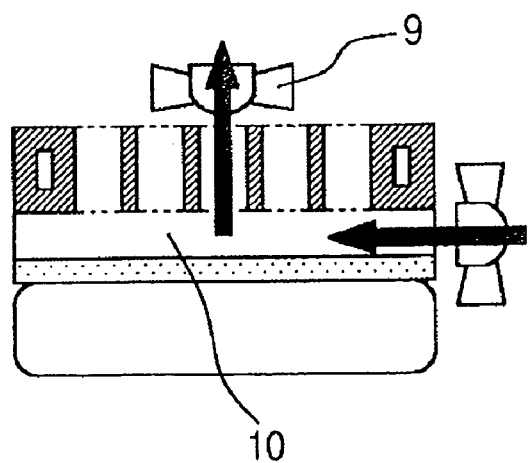
Figure 6:
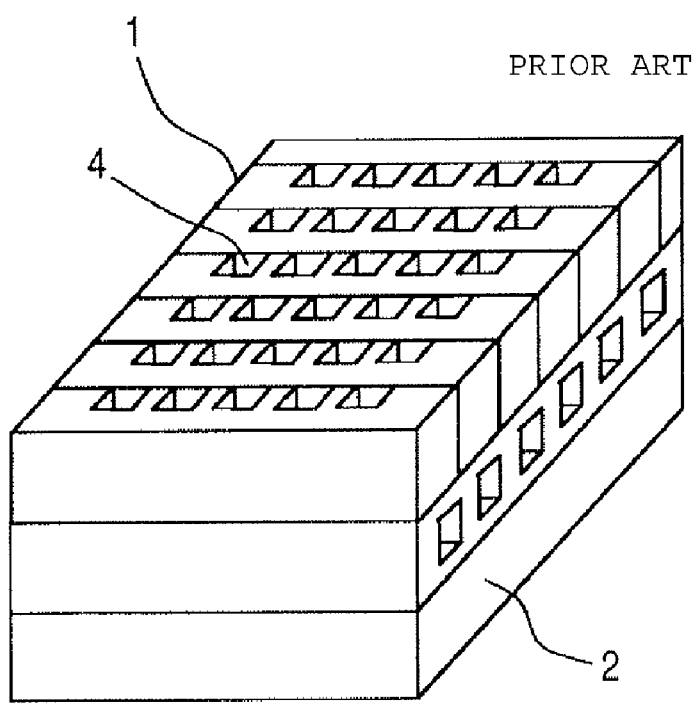
FIG. 6 is a schematic perspective view of a fuel cell system of the prior art.
Figure 7:
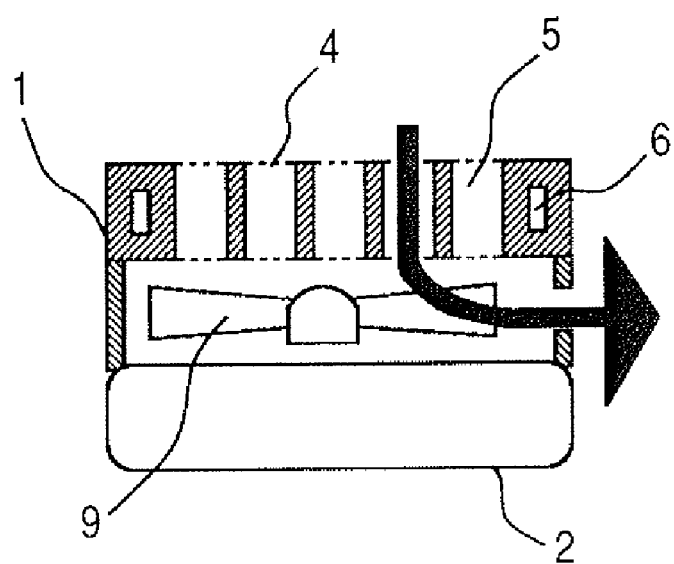
FIG. 7 is a schematic cross-sectional view of the fuel cell system of the prior art.

In the fuel cell system in accordance with the embodiments of the present invention, it is possible to provide an air blower 9, as schematically shown in FIGS. 5A, 5B, and 5C. FIG. 5A is a schematic view illustrating an example in which an air blower 9 is provided at the central portion of the fuel cell stack 1. A small-sized fan is used as the air blower 9, and a configuration is adopted in which air flow passes through the oxidizer flow path 5 of the fuel cell stack 1 from the hydrogen tank 2 side and goes out into the atmosphere. The central portion of the fuel cell stack is at a relatively high temperature during the power generation, the supply of air humidified by the water holding member makes it possible to prevent the drying of the proton exchange membrane.

FIG. 5B is a schematic view illustrating an example in which the humidification is accelerated. The configuration is such that two fans are disposed at the peripheral portion of the fuel cell stack which is maintained at a relatively low temperature during the power generation, and air flow is supplied to the water holding member from the fuel cell stack. At the water holding member absorption of water is effected, while at the central portion of the fuel cell stack the heated air is humidified with water of the water holding member and supplied to the fuel cells.

FIG. 5C is a schematic view illustrating an example in which in order to accelerate the water vaporization at the water holding member, two fans are provided, respectively, at the central portion of the fuel cell stack and at an end portion of an air flow path 10 provided between the fuel cell stack and the water holding member, and air is blown by the fans. With the present example, it is possible to efficiently discharge the water in the water holding member without increasing the air flow through the oxidizer flow path 5.

According to the fuel cell system of the present invention, it is possible to prevent the drying of a proton exchange membrane and to prevent the generation of liquid droplets at a hydrogen tank surface which blocks the supply of air, at the same time. Further, the tolerance to water balance increases and complicated control for management of water becomes unnecessary. Accordingly, further reduction in size of a fuel cell system becomes possible, and utilization for a small-sized proton exchange membrane fuel cell especially suitable for a portable electronic equipment can be made possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-265790, filed Sep. 13, 2005, which is hereby incorporated by reference herein in its entirety.

What is claimed is:

1. A fuel cell system comprising a hydrogen tank, a fuel cell stack disposed such that a first air hole thereof faces the hydrogen tank and a second air hole thereof is open to the atmosphere, and a water holding member provided between the hydrogen tank and the fuel cell stack on a surface of the hydrogen tank facing the first air hole of the fuel cell stack, such that the water holding member collects and holds water generated in the fuel cell stack and directly humidifies the first air hole.

2. The fuel cell system according to claim 1, wherein an air flow path is provided between the first air hole of the fuel cell stack and the water holding member.

3. The fuel cell system according to claim 2, wherein at least one air blower is provided in at least one position selected from the group consisting of a portion of the second air hole and an end portion of the air flow path.

* * * * *